United States Patent
Achee et al.

(10) Patent No.: US 11,066,303 B2
(45) Date of Patent: Jul. 20, 2021

(54) ELECTROCHEMICALLY EXPANDED MATERIALS AND REACTOR AND METHOD FOR PRODUCING THE SAME

(71) Applicant: The Texas A&M University system, College Station, TX (US)

(72) Inventors: Thomas C. Achee, College Station, TX (US); Micah J. Green, College Station, TX (US); Charles B. Sweeney, College Station, TX (US); Wanmei Sun, College Station, TX (US)

(73) Assignee: The Texas A&M University System, College Station, TX (US)

( * ) Notice: Subject to any disclaimer, the term of this patent is extended or adjusted under 35 U.S.C. 154(b) by 218 days.

(21) Appl. No.: 16/318,351

(22) PCT Filed: Aug. 8, 2017

(86) PCT No.: PCT/US2017/045980
§ 371 (c)(1),
(2) Date: Jan. 16, 2019

(87) PCT Pub. No.: WO2018/031591
PCT Pub. Date: Feb. 15, 2018

(65) Prior Publication Data
US 2019/0233291 A1  Aug. 1, 2019

Related U.S. Application Data

(60) Provisional application No. 62/372,185, filed on Aug. 8, 2016.

(51) Int. Cl.
*B01J 8/00* (2006.01)
*B01J 19/00* (2006.01)
(Continued)

(52) U.S. Cl.
CPC .......... *C01B 32/19* (2017.08); *B01J 8/00* (2013.01); *C01B 32/225* (2017.08); *C25B 1/00* (2013.01);
(Continued)

(58) Field of Classification Search
CPC ....... C01B 32/00; C01B 32/15; C01B 32/182; C01B 32/184; C01B 32/19; C01B 32/20;
(Continued)

(56) References Cited

U.S. PATENT DOCUMENTS

| 4,350,576 A | 9/1982 | Burch et al. |
| 2013/0102084 A1 | 4/2013 | Loh et al. |

(Continued)

FOREIGN PATENT DOCUMENTS

| CN | 105731429 A | 7/2016 |
| WO | 2015-075455 A1 | 5/2015 |

OTHER PUBLICATIONS

International Search Report and Written Opinion dated Dec. 11, 2017, issued in corresponding Application No. PCT/US2017/045980, filed Aug. 8, 2017, 13 pages.
(Continued)

*Primary Examiner* — Natasha E Young
(74) *Attorney, Agent, or Firm* — Christensen O'Connor Johnson Kindness PLLC

(57) ABSTRACT

Methods and reactors for electrochemically expanding a parent material and expanded parent materials are described. Current methods of expanding parent materials incompletely-expand parent material, requiring expensive and time-consuming separation of expanded parent material from unexpanded parent materials. This problem is addressed by the methods and reactor for electrochemically expanding a parent material described herein, which during operation maintain electrical connectivity between the par-
(Continued)

ent material and an electrical power source. The resulting materials described herein have a greater proportion of expanded parent material relative to unexpanded parent material compared to those made according to others methods.

13 Claims, 13 Drawing Sheets

(51) Int. Cl.
    *B01J 19/24*     (2006.01)
    *C01B 32/19*     (2017.01)
    *C01B 32/225*     (2017.01)
    *C25B 1/00*     (2021.01)
    *C25B 9/19*     (2021.01)
    *B82Y 40/00*     (2011.01)
    *B82Y 30/00*     (2011.01)

(52) U.S. Cl.
    CPC .................. *C25B 9/19* (2021.01); *B82Y 30/00* (2013.01); *B82Y 40/00* (2013.01); *C01P 2002/82* (2013.01); *C01P 2004/02* (2013.01); *C01P 2004/03* (2013.01); *C01P 2004/04* (2013.01); *C01P 2004/24* (2013.01)

(58) Field of Classification Search
    CPC ....... C01B 32/21; C01B 32/22; C01B 32/225; C01P 2002/00; C01P 2002/80; C01P 2002/82; B01J 8/00; B01J 19/00; B01J 19/24; C25B 1/00; C25B 9/00; C25B 9/17; C25B 9/18
    See application file for complete search history.

(56) References Cited

U.S. PATENT DOCUMENTS

2013/0161199 A1    6/2013   Li et al.
2014/0061059 A1    3/2014   Dryfe et al.

OTHER PUBLICATIONS

Notice of First Office Action dated Jun. 17, 2020, issued in corresponding Chinese Application No. 201780048905.8 filed Aug. 8, 2017, 15 pages.

ELECTROCHEMICALLY EXPANDED MATERIALS AND REACTOR AND METHOD FOR PRODUCING THE SAME

CROSS-REFERENCE TO RELATED APPLICATION

This application is a national stage application claiming priority to PCT/US2017/045980, now WO 2018/031591, filed on Aug. 8, 2017, which claims the benefit of U.S. Provisional Application No. 62/372185, filed Aug. 8, 2016, the contents of which are incorporated herein by reference in their entirety.

STATEMENT OF GOVERNMENT LICENSE RIGHTS

This invention was made with Government support under CMMI-1253085 awarded by the National Science Foundation. The Government has certain rights in the invention.

BACKGROUND

Electrochemical expansion of nanosheets expands nanosheet parent materials, such as graphite flakes or bulk molybdenum disulfide, by placing the parent materials under an electrical potential bias while the parent materials are in a specific chemistry that facilitates the expansion of the parent materials under the electrochemical bias. FIG. 2A schematically illustrates expansion of a parent material 40 to an expanded parent material 44. This expansion occurs through multiple mechanisms.

In one type of process, electrochemical treatment causes the van der Waals forces holding the nanosheets in the material together to become weaker, allowing for greater ease of exfoliation by mechanical processes. These processes usually convert some fraction of the parent material to nanomaterials, with that fraction usually being small.

Other processes utilize electrochemical exfoliation, but their processing of the parent materials is incomplete because the expansion of the parent material causes the parent material to fall apart. Because these methods usually use rods of compressed nanomaterial powder or foil as electrodes, these pieces of incompletely-expanded material fall out of contact and disrupt the needed flow of electrical power, causing a failure to completely expand. As shown in FIG. 2B, when a voltage is applied between an electrode and a solid graphite rod immersed in sulfate solution the graphite rod partially exfoliates and falls apart, thereby disrupting electrical contact between the graphite rod and the voltage source. The result is incompletely-expanded graphite, shown here accumulated at the bottom of container.

Further, separation of expanded parent material from unexpanded parent material is time consuming and expensive.

Such degradation of the electrode is one of the main barriers to making electrochemical processing of layered materials a scalable process.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In an aspect, the present disclosure provides a method of producing an expanded parent material from a parent material in contact with an electrolyte solution, comprising applying potential bias to a slurry comprising the parent material and the electrolyte solution sufficient to produce the expanded parent material while maintaining electrical connectivity through the parent material as the expanded parent material is generated.

In another aspect, the present disclosure provides a reactor configured to deliver electric current to a parent material to produce expanded parent material, the reactor comprising: an electrically insulating container, comprising: an expandable chamber configured to contain the parent material, wherein the expandable chamber is configured to expand in at least one direction in order to accommodate expansion of the parent material as it transitions to the expanded parent material, while also maintaining pressure on the parent material and any expanded parent material sufficient to maintain the conditions necessary to generate the expanded parent material; an electrolyte chamber configured to be in fluid communication with an electrolyte solution; and a porous membrane separating the expandable chamber and the electrolyte chamber configured to allow ions to pass through the porous membrane but not the parent material and any expanded parent material; wherein the porous membrane is configured to contain the pressure of the expanded parent material; and an electrical system, comprising: a first electrode configured to be in electrical communication with an interior of the expandable chamber and any parent material disposed in the expandable chamber; and a second electrode configured to be in electrical communication with the electrolyte chamber and any electrolyte solution disposed in the electrolyte chamber.

In an aspect, the present disclosure provides composition comprising an expanded parent material comprising exfoliated nanosheets having an average largest lateral dimension of between about 75 µm and about 300 µm.

In an aspect, the present disclosure provides a method of producing an expanded parent material from a parent material in contact with an electrolyte solution, comprising applying potential bias to a slurry comprising the parent material and the electrolyte solution sufficient to produce the expanded parent material while maintaining electrical connectivity through the parent material as the expanded parent material is generated, wherein the method is performed using a reactor as disclosed herein.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

FIG. 11E is a scanning electron microscopy image of electrochemically exfoliated graphene according to an aspect of the disclosure.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

In the following description, numerous specific details are set forth in order to provide a thorough understanding of one or more embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

The present disclosure relates generally to expanded parent materials, reactors useful in producing expanded parent materials, and methods useful in producing expanded parent materials. Generally described, parent materials expand incompletely using methods of the prior art, as described hereinabove. Parent materials are discussed further herein with respect to the methods provided by the present disclosure.

Reactor

In one aspect, the present disclosure provides a reactor configured to apply potential bias to a parent material to produce expanded parent material. The following discussion provides examples of reactors that include an expandable chamber configured to contain a parent material separated from an electrolyte chamber by a porous membrane. As will be described in more detail below, the expandable chamber is configured to expand as the parent material is converted to an expanded parent material. Further, the porous membrane is configured to allow ions in an electrolyte solution to pass between an electrolyte chamber and the expandable chamber, but not the parent material or any expanded parent material.

Figure 1:
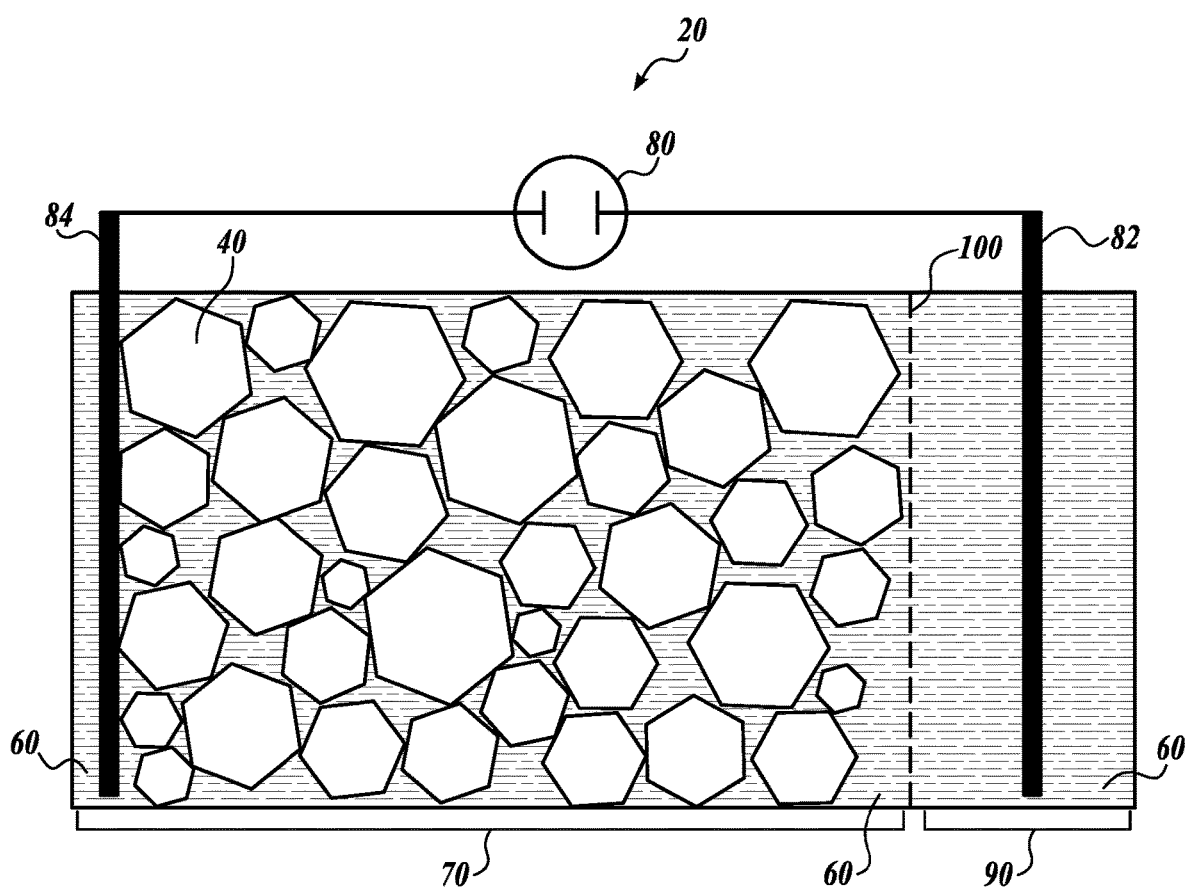
FIG. 1 is a cross sectional view of a reactor in accordance with an aspect of the disclosure.
Figure 2A:
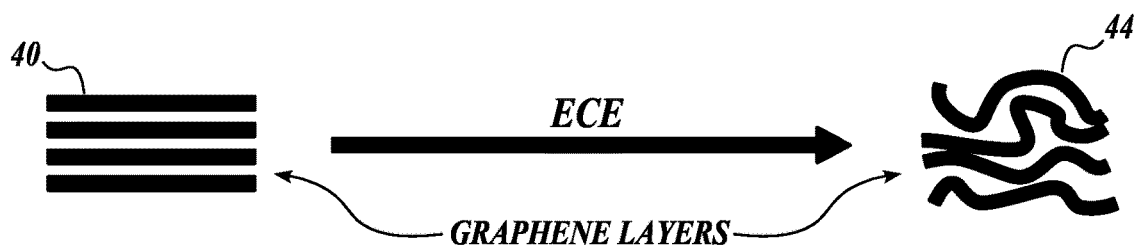
FIG. 2A schematically illustrates electrochemical exfoliation of a layered parent material.
Figure 2B:
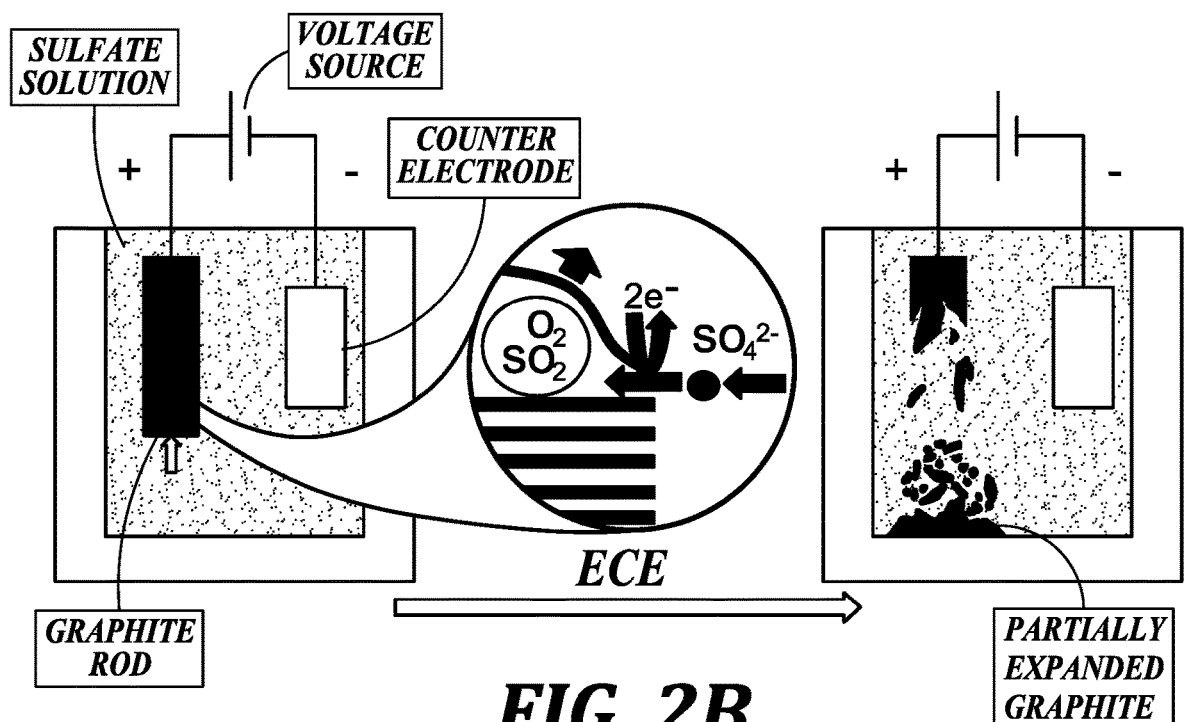
FIG. 2B illustrates partial electrochemical exfoliation using a system and method according to the prior art.

In that regard, attention is directed to FIG. 1, which schematically illustrates a representative reactor 20 according to the present aspect. As shown, reactor 20 includes an expandable chamber 70 configured to contain a parent material 40 and expand in at least one direction in order to accommodate expansion of the parent material 40 as it transitions to the expanded parent material 44. In this regard and as will be described in more detail below, the reactor 20 is configured to maintain pressure on the parent material 40 and any expanded parent material 44 sufficient to maintain the conditions necessary to generate the expanded parent material 44.

The reactor 20 also includes an electrolyte chamber 90 configured to be in fluid communication with an electrolyte solution 60; and a porous membrane 100 separating the expandable chamber 70 and the electrolyte chamber 90. In this regard, the reactor is configured to allow ions in the electrolyte solution 60 to pass through the porous membrane 100 and but not the parent material 40 and any expanded parent material 44. As shown, the electrolyte solution 60 is in fluid communication with both the electrolyte chamber 90 and the expandable chamber 70, wherein the electrolyte solution 60 intercalates between the particles or flakes of the parent material 40. By maintaining pressure on the parent material 40 and providing electrical connectivity to the parent material 40 through the electrolyte solution 60, the parent material 40 can be expanded more completely than if the pressure was not applied.

The reactor 20 further includes an electrical system configured to apply a potential bias to the parent material 40 and the electrolyte solution 60 sufficient to produce the expanded parent material 44. In an embodiment, the electrical system includes a first electrode 84 configured to be in electrical communication with an interior of the expandable chamber 70 and any parent material 40 disposed in the expandable chamber 70. As shown, the first electrode 84 is in electrical communication with an electrical power source 80. In this regard, the electrical system is configured to apply potential bias to the parent material 40.

In an embodiment, the first electrode 84 is made of a noble metal. In an embodiment, the first electrode comprises a metal chosen from platinum, palladium, iridium, gold, and combinations thereof.

The reactor 20 further includes a second electrode 82 configured to be in electrical communication with the electrolyte chamber 90 and any electrolyte solution 60 in fluid communication with the electrolyte chamber 90. The second electrode 82 is also in electrical communication with to the electrical power source 80. Accordingly, during operation a circuit is formed that comprises the electrical power source 80, the first electrode 84, the second electrode 82, the electrolyte solution 60, and the parent material 40.

In an embodiment, the second electrode 82 comprises graphite. In an embodiment, the graphite is in the form of graphite foil or a graphite rod. In an embodiment, the second electrode comprises a metal chosen from platinum, palladium, iridium, gold, and combinations thereof.

In an embodiment, the electrical power source 80 is configured to produce electrical power sufficient to generate expanded parent material 44 from the parent material 40. In an embodiment, the electrical power source 80 is configured to produce between about 1 W and about 200 W. In an embodiment, the electrical power source 80 is configured to produce between about 1 W and about 10 W. Higher currents can be applied with electrodes having larger surface areas. Likewise, higher currents can be applied wherein the first electrode 84 and the second electrode 82 are separated by a smaller distance.

In an embodiment, the electrical power source 80 is configured to apply a potential bias between about 1 V and about 20 V to the parent material 40. In an embodiment, the electrical power source 80 is configured to apply a potential bias between about 5 V and about 15 V to the parent material 40. In an embodiment, the electrical power source 80 is configured to apply a potential bias of about 10 V to the parent material 40.

In an embodiment, the electrical power source 80 is configured to produce an alternating current. In an embodiment, the alternating current is in the form of a square wave. In an embodiment, the alternating current is sinusoidal. In an embodiment, the alternating current has a constant voltage.

In an embodiment, the electrical power source 80 is configured to produce a direct current.

Reactor 20 includes a porous membrane 100 separating the expandable chamber 70 and the electrolyte chamber 90, wherein porous membrane 100 is configured to allow ions to pass through the porous membrane 100. In an embodiment, porous membrane 100 is configured to allow electrolyte solution 60 solvent Further, parent material 40 and any expanded parent material 44 are not allowed to pass through the porous membrane 100. In this regard, the porous membrane 100 is configured to contain the pressure of the expanded parent material 44 and thereby assist in maintaining pressure on the parent material 40 and any expanded parent material 44 sufficient to maintain the conditions necessary to generate the expanded parent material 44.

In an embodiment, the porous membrane 100 comprises pores configured to exclude the parent material. In an embodiment, the porous membrane comprises pores having pore sizes smaller than an average smallest lateral dimension of the parent material 40 and the expanded parent material 44. As used herein, a smallest lateral dimension of the parent material refers the smallest distance between two points on one of the first major surface or second major surface. First major surfaces and second major surfaces are discussed further herein with respect to largest lateral dimensions of expanded parent materials.

In an embodiment, the porous membrane 100 comprises pores having pore sizes between about 10 nm and about 10 µm. In an embodiment, the porous membrane 100 comprises pores having pore sizes of about 25 nm to about 75 nm.

In an embodiment, the porous membrane 100 comprises a material chosen from a porous polymeric material, a porous metallic material, porous glass, a woven porous material, a non-woven porous material, and combinations thereof. In an embodiment, the porous membrane comprises a porous material chosen from hydrophilic polytetrafluoroethylene (PTFE), hydrophobic PTFE, glass, cellulose, polycarbonate, cellulose acetate, nylon, cellulose esters, cotton cloth, and combinations thereof.

Figure 3:
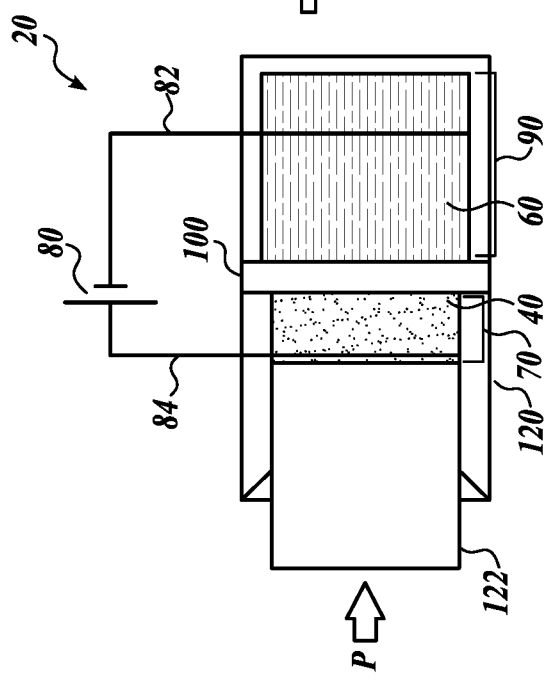
FIGS. 3A and 3B illustrate electrochemical exfoliation using another reactor in accordance with an aspect of the disclosure.
Figure 3:
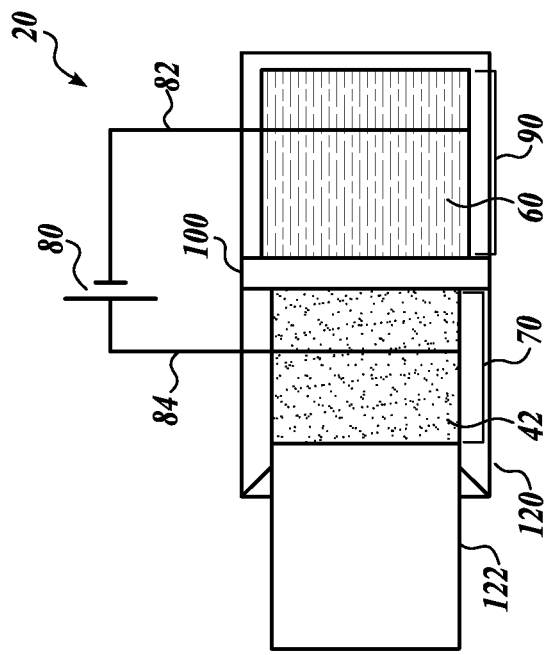

In an embodiment, the reactor 20 includes an expandable element configured to expand as pressure within the expandable chamber 70 increases to allow expansion, such as exfoliation, of the parent material 40 to occur. In that regard, attention is directed to FIGS. 3A and 3B, wherein representative embodiments of a reactor 20 are illustrated. As shown, reactor 20 includes an electrically insulating container 120, which in part defines the expandable chamber 70. The reactor 20 also includes an expandable element 122, shown here as a piston.

As the electrical power source 80 applies power to the parent material 40 at least a portion of the parent material 40 is converted to expanded parent material 44 to provide a composition 42, in an embodiment, including both expanded parent material 44 and some amount of parent material 40. The composition 42 has a larger volume than the parent material 40 that generated composition 42 due to the expansion of the parent material 40. This larger volume is accommodated by the expandable element 122 as it expands in at least one direction to increase the volume of the expandable chamber 70.

In an embodiment, the expandable element 122 is a piston slideably moveable within electrically insulating container 120. As above, the expandable chamber is configured to contain the parent material 40 and any expanded parent material 44. Accordingly, as the piston moves to expand the expandable chamber 70 it also contains composition 42 within the expandable chamber 70. In an embodiment, the piston is a hydraulic piston. In an embodiment, the piston is a pneumatic piston. In an embodiment, the expandable element 122 is a stretchable container, such as a balloon, configured to expand in a number of directions as pressure within the expandable chamber 70 is increased. In an embodiment, the expandable element 122 is a bellows. In an embodiment, the expandable element 122 comprises a diaphragm configured to contain any parent material 40 and any expanded parent material 44. In an embodiment, the diaphragm is a hydraulically actuated diaphragm or an electromechanically-actuated diaphragm.

As shown, in an embodiment, the expansion of the expandable chamber 70 through the movement of the expandable element 122 is resisted by a pressure P. With expandable element 122, the expandable chamber 70 is configured to expand in at least one direction in order to accommodate expansion of the parent material 40 as it transitions to the expanded parent material 44. Pressure P maintains pressure on the parent material 40 and any expanded parent material 44 sufficient to maintain the conditions necessary to generate the expanded parent material 44.

Figure 4:
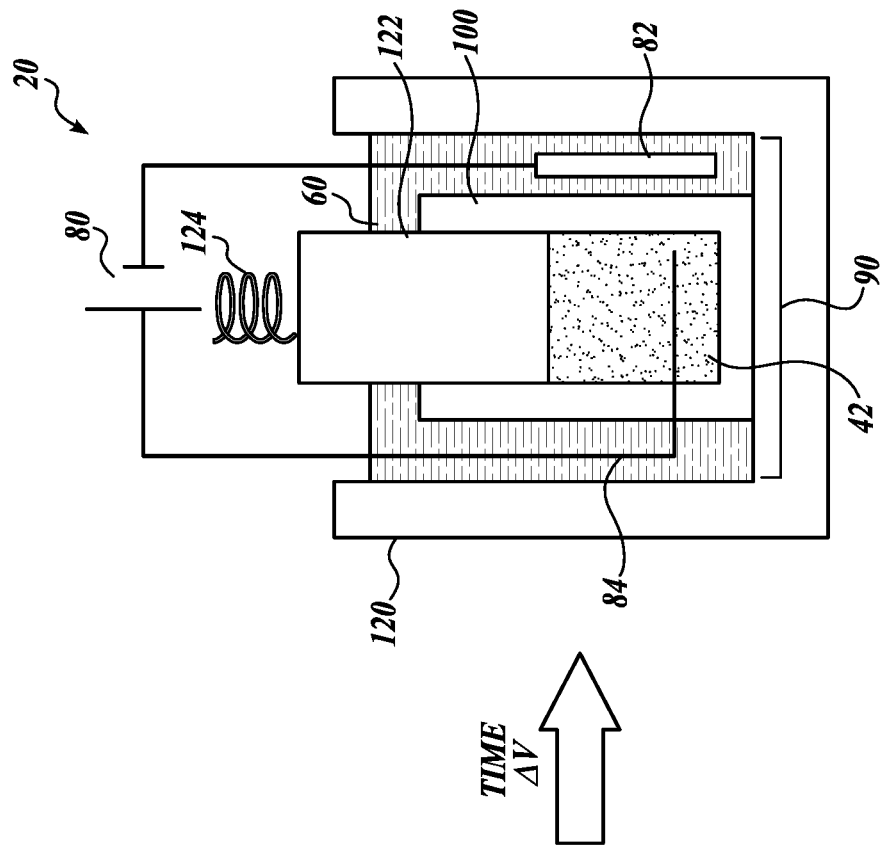
FIGS. 4A and 4B illustrate electrochemical exfoliation using another reactor in accordance with an aspect of the disclosure.
Figure 4:
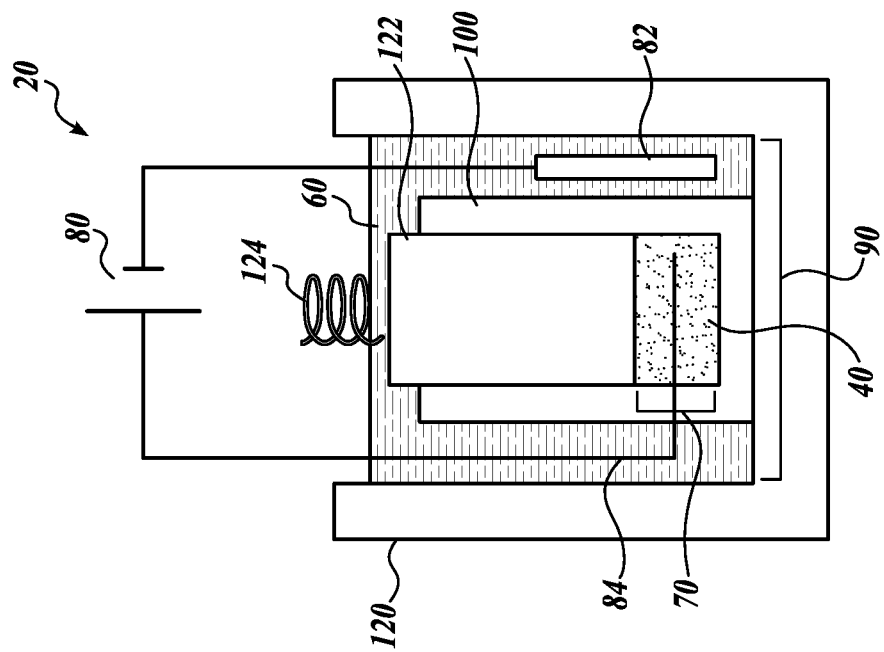

In an embodiment, the reactor 20 includes a pressurizer biased to resist the expansion of the expandable chamber, thereby maintaining the conditions necessary to generate the expanded parent material 44. In that regard, attention is directed to FIGS. 4A and 4B, where representative embodiments of reactor 20 including a pressurizer 124 are illustrated. Reactor 20 includes electrically insulating container 120, which in part defines the electrolyte chamber 90 and, in an embodiment, is in fluid communication with electrolyte solution 60. As shown, in an embodiment expandable chamber 70 is defined by porous membrane 100 and expandable element 122. In an embodiment, the expandable chamber 70 and second electrode 82 are submersed in electrolyte solution 60. As shown, the pressurizer 124, shown here as a coil spring, is coupled with expandable element 122 and biased to resist the expansion of the expandable chamber 70. When a potential bias is applied to the parent material 40 the parent material 40 is expanded to generate a composition 42 including parent material 40 and expanded parent material 44, wherein the composition 42 has a greater volume than the parent material 40, as shown in FIG. 4B. As shown in FIG. 4B, the pressurizer 124 is compressed as the expandable element 122 moves to increase the volume of expandable chamber 70, thereby resisting expansion of the expandable chamber 70.

In an embodiment, the pressurizer 124 is configured to apply a pressure to the parent material sufficient to maintain the conditions necessary to generate the expanded parent material while allowing the parent material 40 to expand as it transitions to the expanded parent material 44. If the pressurizer applies too much pressure then the parent material 40 expansion and transition to an expanded parent material 44 stops or the structure of the reactor 20 fails. Alternatively, if the pressurizer applies too little pressure to the parent material 40 connectivity between portions of the parent material is not maintained.

Figure 5:
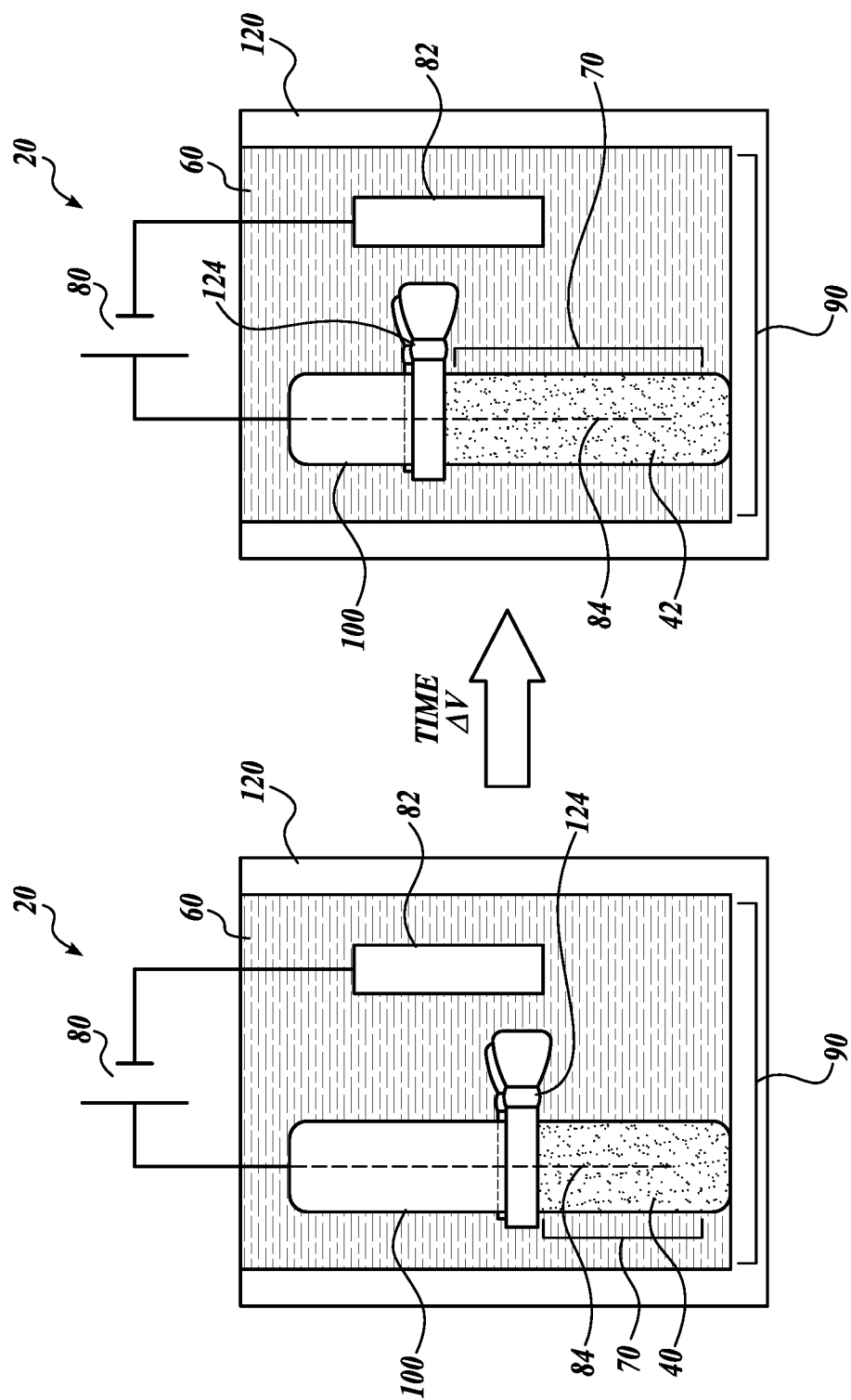
FIGS. 5A and 5B illustrate electrochemical exfoliation using another reactor in accordance with an aspect of the disclosure.

In an embodiment, the pressurizer 124 includes one or more clamps slideably coupled to the porous membrane 100. In that regard, attention is directed to FIGS. 5A and 5B, where a reactor 20 in accordance with the present aspect is illustrated. As shown, a porous membrane 100, shown here as a dialysis bag having an open end toward the top of FIGS. 5A and 5B and a closed end toward the bottom of FIGS. 5A and 5B, is at least partially submerged in electrolyte solution 60 and has parent material 40 disposed therein. The clamp 124 is coupled to and applies pressure to a portion of porous membrane 100 above a top-most portion of parent material 40, thereby compressing the parent material 40 between the clamp 124 and the closed end of the dialysis bag 100. As a potential bias is applied to the parent material 40 through the electrical system, including the electrical power source 80, first electrode 84, and second electrode 82, at least a portion of the parent material 40 is expanded. The expansion of the parent material 40 increases pressure within the expandable chamber 70 and displaces the clamp 124, thereby increasing the volume of the expandable chamber 70. Friction between the clamp 124 and the porous membrane 100 resists expansion of the expandable chamber 70. In this regard, the pressurizer physically compacts and contains parent material 40. Accordingly, the clamp 124 maintains pressure on the parent material 40 and any expanded parent material 44 sufficient to maintain the conditions necessary to generate the expanded parent material 44.

In an embodiment, the pressurizer 124 is a stepper motor. In an embodiment, the pressurizer 124 is a weight configured to compress the parent material 40.

In an embodiment, the reactor 20 includes a centrifuge and pressure is maintained on the parent material 40 and any expanded parent material 44 through centrifugal force.

With the objective of maintaining connectivity between the parent material 40 and first electrode 84, pressure can be applied in at least two different regimes. First, pressure can be applied such that the amount of pressure on the parent material 40 is constant as it expands, therefore requiring that the pressure applied is reactive to the expanding volume of material. In the second configuration, the volumetric expansion of the expandable chamber 70 is predetermined and the pressure may vary as the parent material 40 expands, but as long as the inter-particle connectivity remains, the reactor 20 still functions properly. The second configuration provides the benefit that it does not require a feedback loop related to the pressure of the expandable chamber 70. Instead, the rate of expansion can be predetermined (and need not necessarily be constant and linear).

Local effective voltage in a parent material 40 scales inversely with the distance to a first electrode 84 disposed within the parent material 40. In an embodiment, the expandable chamber 70 is a cylindrical or an otherwise elongate chamber having a relatively high aspect ratio, configured to lower average distances between a portion of the first electrode 84 and parent material 40. As used herein, an aspect ratio of an expandable chamber 70 refers to the ratio of a height of the expandable chamber 70 having relative to the largest lateral dimension of the expandable chamber 70.

Figure 7A:
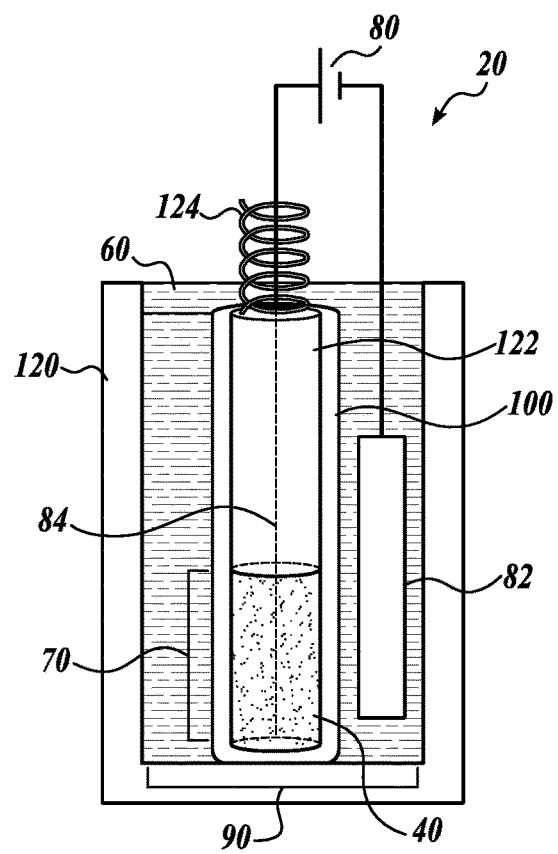
FIGS. 7A and 7B illustrate electrochemical exfoliation using another reactor in accordance with an aspect of the disclosure.
Figure 7B:
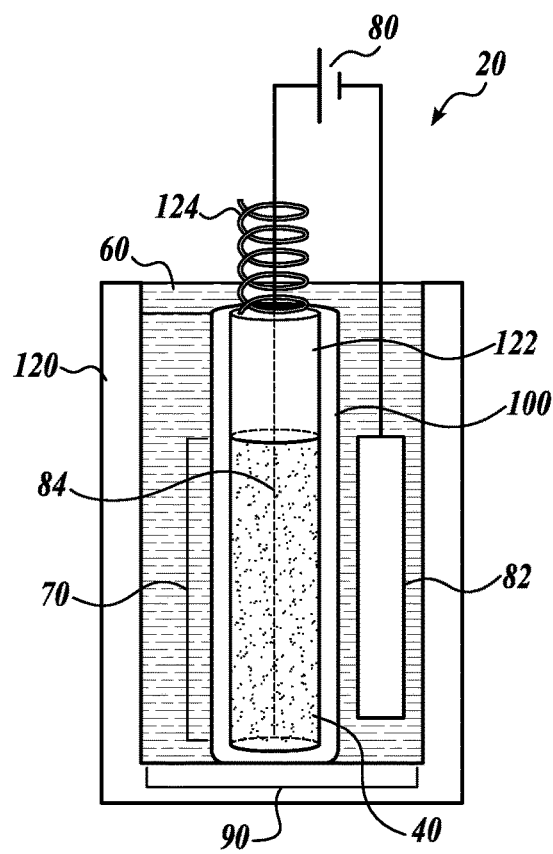
Figure 7C:
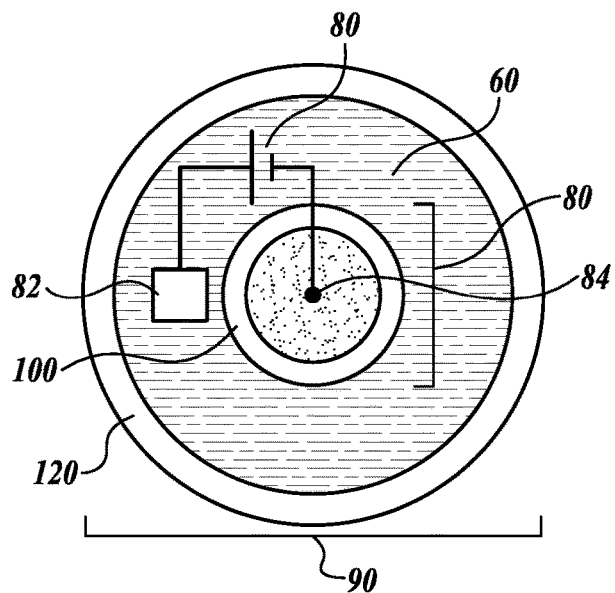

In this regard, attention is directed to FIGS. 7A, 7B, and 7C, where a reactor 20 in accordance with the present aspect including a cylindrical expandable chamber 70 is illustrated. As shown, porous membrane 100 is cylindrical and, together with the expandable element 122, shown here as a piston slideably coupled to the porous membrane 100, defines a cylindrical expandable chamber 70. The electrical system includes an electrical power source 80 and a second electrode 82 configured to be in electrical communication with the electrolyte chamber 90 and electrolyte solution 60 in fluid communication with the electrolyte chamber 90. The electrical system further includes a first electrode 84, shown here as a wire, extending along a length of the cylindrical expandable chamber 70. FIG. 7C provides a cross-sectional view of reactor 20. As shown, the first electrode 84 is disposed within the expandable chamber 70 so that an average nearest distance between a portion of the parent material 40 and the first electrode 84 is decreased relative to an expandable chamber 70 with a lower aspect ratio. In this regard, reactor 20 is configured to rapidly produce expanded parent material 44 and increase a batch size for the reactor 20.

Figure 9A:
FIGS. 9A, 9B, 9C, 9D, and 9E illustrate electrodes in accordance with an aspect of the disclosure.
Figure 9B:
Figure 9C:
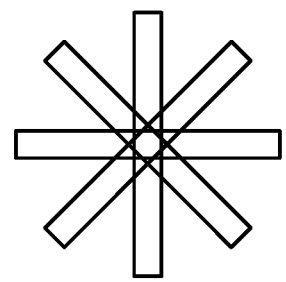
Figure 9D:
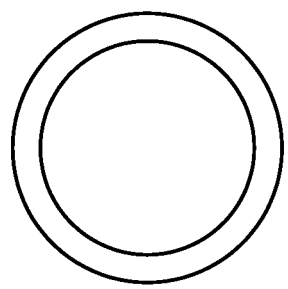
Figure 9E:
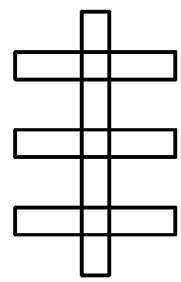

As above, in an embodiment, the first electrode 84 is a wire extending down a length of the expandable chamber 70. However, the first electrode 84 may be any shape configured to be in electrical communication with an interior of the expandable chamber 70 and any parent material 40 disposed in the expandable chamber 70. In that regard, attention is turned to FIGS. 9A, 9B, 9C, 9D, and 9E, where cross-sections of first electrodes 84 according to the present aspect are illustrated. In an embodiment, the first electrode 84 is in the shape of a wire, as shown in FIG. 9A. However, effective local voltage scales inversely with the distance between parent material 40 and the first electrode 84 for a given electrode and a given applied voltage. Accordingly, in certain embodiments the first electrode 84 comprises one or more sheets or fins with greater surface area or greater cross-sectional width than a wire, such as those illustrated in FIGS. 9B, 9C, 9D, and 9E. In this regard, the first electrode 84 is closer to a greater portion of any parent material 40 disposed in the expandable chamber 70 than a wire-shaped first electrode 84 and, thereby, configured to expand a greater portion of any parent material 40 disposed in expandable chamber 70 in a given period of time.

In an embodiment, the surface area of the second electrode 82 is larger than the surface area of porous membrane 100.

In an embodiment, the expandable chamber 70 is a first expandable chamber and the reactor 20 further includes one or more additional expandable chambers each configured to contain a parent material 40. In an embodiment, reactor 20 includes a second, third, fourth, fifth, sixth, or more expandable chamber.

In this regard, reactors 20 including two or more expandable chambers are advantageously configured to produce more expanded parent material 44 than a reactor 20 including a single expandable reactor 70 commensurate with the increased volume of the additional expandable chamber(s). In that regard, attention is directed to FIG. 8, where a reactor 20 including a first expandable chamber 70a and a second expandable chamber 70b is illustrated. Reactor 20 includes an electrically insulating container 120 in fluid communication with an electrolyte solution 60 into which first porous membrane 100a and second porous membrane 100b are at least partially submerged. Reactor 20 includes expandable elements 122a and 122b carried by porous membranes 100a and 100b, respectively, which, together with porous membranes 100a and 100b, define expandable chambers 70a and 70b. As shown, parent material 40a and parent material 40b are disposed in expandable chambers 70a and 70b, respectively. Reactor 20 includes an electrical system that, in an embodiment, includes an electrical power source 80, first electrode 84a, third electrode 84b, and second electrode 82. As shown, first electrode 84a is in electrical communication with the interior of expandable chamber 70a and first parent material 40a. Likewise, third electrode 84b is in electrical communication with the interior of expandable chamber 70b and second parent material 40b. Second electrode 82 is in electrical communication with electrolyte solution 60 in fluid communication with electrolyte chamber 90. Electrical power source 80 is in electrical communication with first electrode 84a, second electrode 84b, and third electrode 82. During operation a circuit is formed that comprises the electrical power source 80, the first electrode 84a, the second electrode 82, the third electrode 84b, the electrolyte solution 60, parent material 40a, and parent material 40b, wherein the power source 80 is configured to produce electrical power sufficient to generate the expanded parent material 44 from parent material 40a and 40b.

In an embodiment, second parent material 40b is composed of the same expandable material as the first parent material 40a. In an embodiment, the second parent material 40b is composed of a different expandable material than the first parent material 40.

In an embodiment, the second porous membrane 100b is composed of the same porous material as the first porous membrane 100a. In an embodiment, the second porous membrane 100b is composed of a different porous material than the first porous membrane 100a.

In an embodiment, the first electrode 84a and the third electrode 84b are composed of the same electrode material. In an embodiment, the first electrode 84a and the third electrode 84b are composed of a different electrode material.

Figure 8:
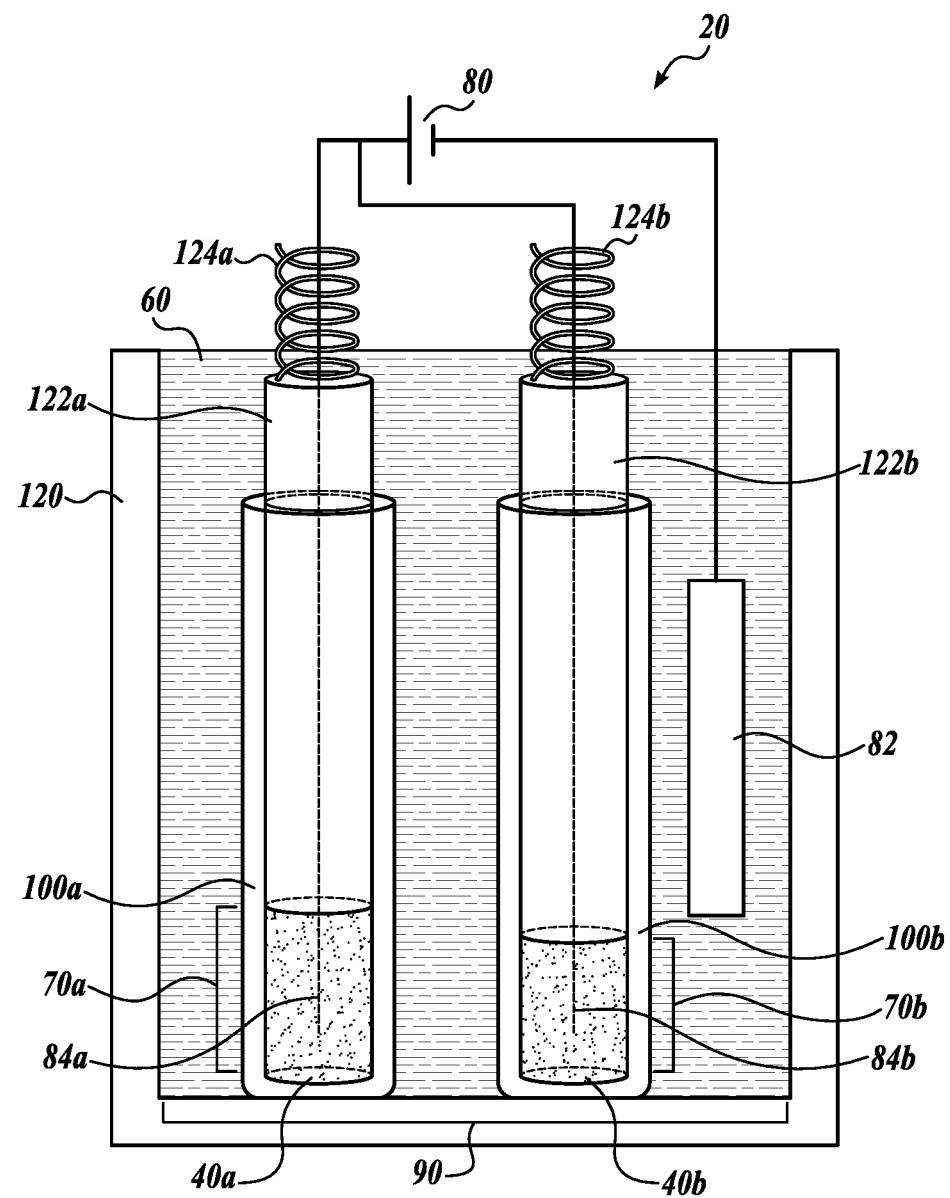
FIG. 8 illustrates another reactor in accordance with an aspect of the disclosure.

Still referring to FIG. 8, reactor 20 includes pressurizers 124a and 124b, shown here as coil springs, biased to resist the expansion of expandable chambers 70a and 70b, respectively. In this regard, expandable chambers 70a and 70b are configured to expand in at least one direction in order to accommodate expansion of parent material 40 and 40b, respectively, as they transition to the expanded parent material 44, while also maintaining pressure on parent material 40a and 40b and any expanded parent material 44 sufficient to maintain the conditions necessary to generate the expanded parent material 44.

Figure 6:
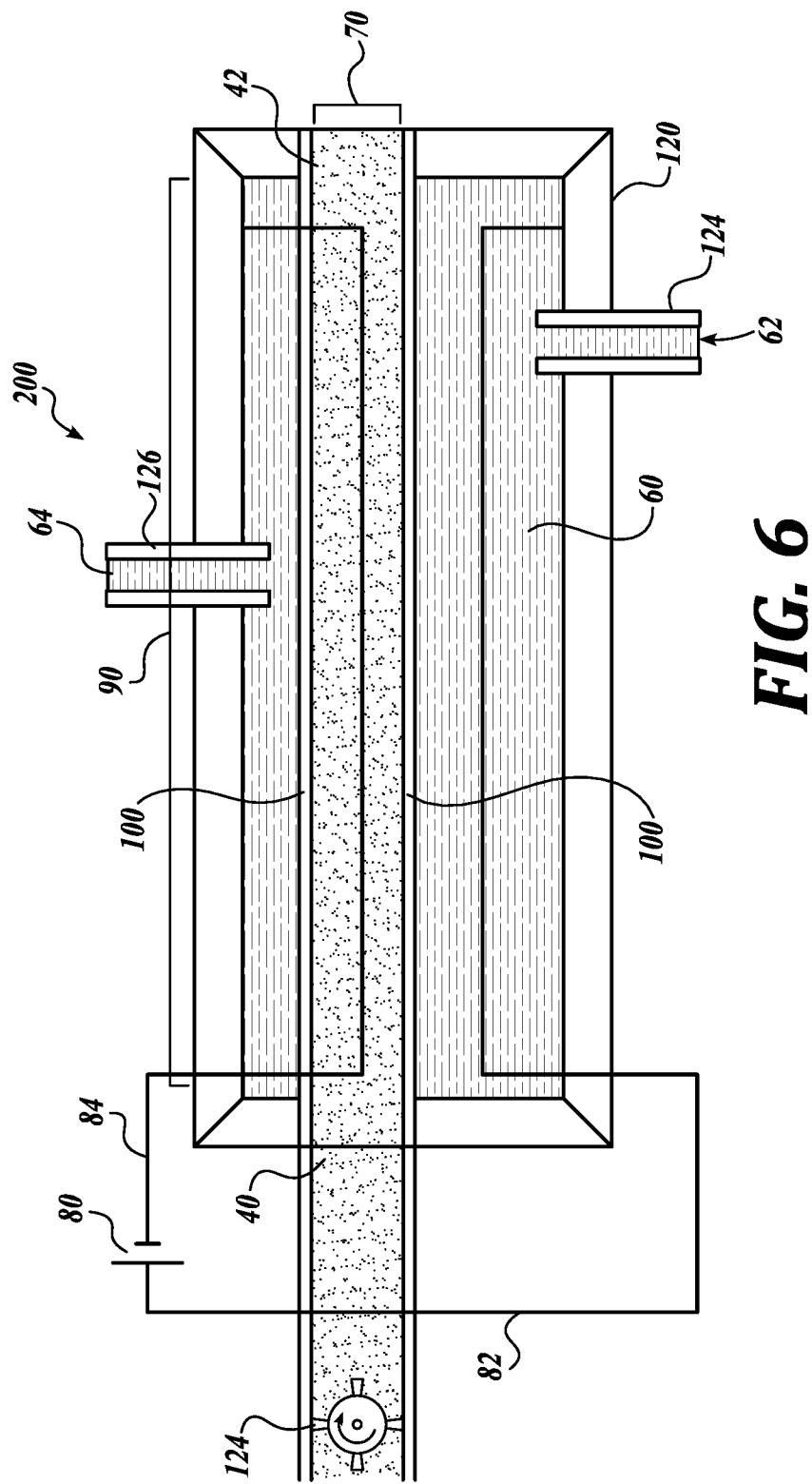
FIG. 6 illustrates another reactor in accordance with an aspect of the disclosure.

In an embodiment, reactor 20 is a continuous flow reactor configured to continuously transform flowing parent material 40 into expanded parent material 44. In that regard, attention is directed to FIG. 6, where a continuous flow reactor 20 according to the present aspect is illustrated. Reactor 20 includes an electrolyte chamber 90, in an embodiment, defined by electrically insulating container 120. As shown, the electrolyte chamber 90 is in fluid communication with electrolyte solution 60. Reactor 20 further includes an expansion chamber 70 extending through at least a portion of the electrolyte chamber 90. As shown, parent material 40 is disposed within expansion chamber 70 at a first end and a composition 42 including parent material 40 and expanded parent material 44 at a second end.

In an embodiment, the expandable chamber 70 of the continuous reactor 20 comprises a flow portion configured to allow continuous passage of the parent material 40; and wherein the porous membrane 100 is carried by the flow portion of the expandable chamber 70.

In an embodiment, the continuous reactor 20 comprises an electrolyte chamber 90 configured to be in fluid communication with an electrolyte solution 60; an inlet 62 in fluid communication with the electrolyte chamber 60 configured to provide the electrolyte solution 60 to the electrolyte chamber 90; an outlet 64 in fluid communication with the electrolyte chamber 64 configured to remove the electrolyte solution 60 from the electrolyte chamber 90; an expansion chamber 70 extending through at least a portion of the electrolyte chamber 90 comprising a porous membrane 100 configured allow passage of the electrolyte solution 60, to contain a parent material 40 and allow its passage through and expansion in the expansion chamber 70, and to separate the parent material 40 and expanded parent material 44 from the electrolyte chamber 90; wherein the porous membrane 100 comprises pores having a size smaller than the parent material 40 and the expanded parent material 44; an electrical system, comprising: a first electrode 84 configured to be in electrical communication with an interior of the expansion chamber 70 and any parent material 40 disposed in the expansion chamber 70; a second electrode 82 configured to be in electrical communication with the electrolyte chamber 90 and any electrolyte solution 60 disposed in the electrolyte chamber 90; and an electrical power 80 source in electrical communication with the first electrode 84 and the second electrode 82, wherein during operation a circuit is formed that comprises the electrical power source 80, the first electrode 84, the second electrode 82, the electrolyte solution 60, and the parent material 40, wherein the electrical power source 80 produces electrical power sufficient to generate the expanded parent material 44 from the parent material 40.

Reactor 20 further includes an electrical system including first electrode 84 in electrical communication with an interior of the expansion chamber 70 and parent material 40; second electrode 82 in electrical communication with electrolyte chamber 90 and electrolyte solution 60; and electrical power source 80 in electrical communication with the first electrode 84 and the second electrode 82. During operation, a circuit is formed that comprises the electrical power source 80, the first electrode 84, the second electrode 82, the electrolyte solution 60, and the parent material 40, wherein the electrical power source 80 produces electrical power sufficient to generate the expanded parent material 44 from the parent material 40.

Reactor 20 includes a pressurizer 124 configured to apply pressure on the parent material 40 and any expanded parent material 44 sufficient to maintain the conditions necessary to generate the expanded parent material 44. In an embodiment and as shown, pressurizer 124 is a pump configured to also provide parent material 40 to the expandable chamber and flow the parent material 40 through the expandable chamber 70. In so doing, the pressuring is configured to apply pressure on the parent material 40 as it flows through the expandable chamber 70. In this regard, reactor 20 is configured to continuously flow the parent material 40 through the expandable chamber 70 and maintain applying pressure on the parent material 40 and any expanded parent material 44 sufficient to maintain the conditions necessary to generate the expanded parent material 44. The expanded parent material 44 is expelled from the second end of expandable chamber 70 along with any unexpanded parent material 40.

In an embodiment, the continuous reactor 20 includes an inlet 124 configured to provide fresh electrolyte solution 62 to the electrolyte chamber 90 and an outlet 126 configured to remove spent electrolyte solution 64 from the electrolyte chamber 70. In this regard, the continuous reactor 20 is configured to provide fresh electrolyte solution 62 to the electrolyte chamber 90 while removing spent electrolyte solution 64 from the electrolyte chamber 90. Accordingly, the continuous reactor 20 can operate without interruption to remove and replace spent electrolyte solution 64.

In an embodiment, reactor 20 comprises a platinum electrode disposed and a graphite flake parent material disposed in a cellulose dialysis tube porous membrane. The cellulose dialysis tube is at least partially submerged in a 0.1 M ammonium sulfate solution. The reactor 20 further includes a clamp applying pressure to the dialysis tube, thereby compressing the graphite and maintaining electrical connectivity between the graphite flake and the first electrode. The reactor includes a second electrode comprising graphite, wherein each of the first electrode and second electrode are in electrical communication with the electrical power source.

In an embodiment, reactor 20 includes an agitator configured to agitate any parent material 40 disposed in the expandable chamber. In this regard, reactor 20 is configured to agitate the parent material 40, thereby providing the electrolyte solution 60 with greater access to the parent material 40.

Methods of Producing an Expanded Parent Material

In another aspect, the present disclosure provides a method of producing an expanded parent material 44 from a parent material 40 in contact with an electrolyte solution 60, as discussed further herein with respect to Example 1.

In an embodiment, the method includes applying a potential bias to a slurry comprising the parent material 40 and the electrolyte solution 60 sufficient to produce the expanded parent material 44 while maintaining electrical connectivity through the parent material 40 as the expanded parent material 44 is generated. In an embodiment, maintaining electrical connectivity through the parent material 40 comprises applying pressure to the parent material 40 as the expanded parent material 44 is generated. In an embodiment, maintaining electrical connectivity through the parent material 40 comprises compacting the parent material 40 and containing the slurry. In this regard, the parent material 40 maintains electrical connectivity as expanded parent material 44 is generated.

In an embodiment, the slurry is disposed in an expandable chamber 70 and wherein applying pressure to the parent material 40 comprises applying pressure within the expandable chamber 70.

In an embodiment, applying pressure to the parent material 40 comprises applying between about 0.1 kPa and about 1 MPa of pressure to the parent material 40. In an embodiment, applying pressure to the parent material 40 comprises applying between about 1 kPa to about 10 kPa of pressure to the parent material 40. In an embodiment, applying pressure to the parent material 40 comprises applying greater than about 56 kPA to the parent material 40.

In an embodiment, applying pressure to the parent material 40 comprises applying a constant pressure as the parent material 40 expands. Alternatively, in an embodiment, applying pressure to the parent material 40 comprises applying a non-constant pressure as the parent material 40 expands.

In an embodiment, the methods of the present aspect are performed in the reactors 20 disclosed herein.

Parent material 40, as used herein, refers to a material that can be exfoliated or otherwise expanded. In an embodiment, the parent material 40 is a layered parent material 40 comprising a plurality of layers adhered or chemically bonded to one another. In an embodiment, at least some of the plurality of layers are adhered to one another through, for example, non-covalent bonds, such as hydrogen bonds, van der Waals forces, and the like. In an embodiment, the layered parent material 40 has layered planar structure.

In an embodiment, the parent material 40 comprises layers that include nanosheets, where nanosheets refer to sheets having thicknesses less than one micron. In an embodiment, the nanosheets have a thickness between about 0.5 nm and about 10 nm. In an embodiment, the parent material 40 comprises layers having planer layers of a single-atom thickness.

In an embodiment, the layered parent material 40 is an electrically-conductive, layered parent material 40.

Graphite is used as an exemplary parent material 44 and graphene is produced as the expanded parent material 44. However, the reactors 20 disclosed herein can be applied to any parent material, especially layered 2D materials. Representative parent materials 44 include tungsten diselenide, molybdenum disulfide, MAX phases, transition metal dichalcogenides, and gallium selenide. Examples of exfoliated nanosheets produced with this method include: graphene, graphene or graphite oxide, graphene, graphyne, borophene, germanene, germanane, silicone, stanine, phosphorene, molybdenite, 2D metals, hexagonal boron nitride, transition metal di-chalcogenides, molybdenum disulfide, tungsten diselenide, and MXenes, Additionally, in certain embodiments, the methods described herein may be applied to other aggregated systems that are not layered or two-dimensional in nature, especially, for example, for de-bundling carbon nanotubes, and other high aspect ratio nanomaterials.

In an embodiment, the parent material 40 is in the form of a powder. In an embodiment, the parent material 40 is the form of flakes or granules. In this regard, the parent material 40 provides a relatively high surface area in contact with the electrolyte solution compared to a bulk material, such as a graphite rod.

The methods of the present disclosure include an electrolyte solution in contact with the parent material. Further, in an embodiment, the parent material 40 a portion of the electrolyte solution 60 in the form of a slurry.

In an embodiment, the method includes agitating the slurry to better intercalate the electrolyte solution 60 into the parent material 40. In this regard, electrical connectivity is maintained with a greater portion of the parent material.

As used herein, an electrolyte solution is a solution including a solvent and one or more solute ions.

In an embodiment, the electrolyte solution 60 is an aqueous solution. In an embodiment, the electrolyte is chosen from sodium sulfate, potassium sulfate, ammonium sulfate, sulfuric acid, nitric acid, phosphoric acid, sodium nitrate, sodium phosphate, potassium phosphate, ammonium phosphate, sodium nitrate, potassium nitrate, ammonium nitrate, sodium perchlorate, potassium perchlorate, ammonium perchlorate, sodium chloride and combinations thereof.

In an embodiment, the electrolyte solution 60 includes lithium ions. In an embodiment, the electrolyte solution 60 includes an organic solvent chosen from dichloromethane, dichlorobenzene, diphenyl ether, dimethylformamide, dimethylsulfoxide, n-methylpyrrolidone, and combinations thereof.

In an embodiment, the electrolyte solution 60 has a concentration of between about 0.01 M and about 1.0 M. In an embodiment, the electrolyte solution 60 has a concentration of about 0.1 M.

In an embodiment, the electrolyte solution 60 is a hydrophilic solution and the method includes functionalizing the parent material with a hydrophilic moiety, as discussed further herein with respect to Example 2. In this regard, the electrolyte solution 60 wets a greater portion of the parent material 40 and exfoliation occurs more quickly and to a greater extent than if the parent material 40 is not functionalized with a hydrophilic moiety.

In an embodiment, functionalizing the parent material 40 with a hydrophilic moiety comprises heating the parent material 40 in an acidic solution.

In an embodiment, the hydrophilic moiety is chosen from a hydroxyl group, a carbonyl group, an amine group, epoxide group, ether group, a diazonium group, and a carboxyl group.

In an embodiment, functionalizing the parent material 40 with a hydrophobic moiety oxidizes a portion of the parent material 40 to provide oxidized expanded parent material 44, the method further comprising reducing any oxidized expanded parent material 44. Oxidized expanded parent material 44 is generally less conductive than un-oxidized expanded parent material 44. Accordingly, by reducing any oxidized expanded parent material 44, bulk expanded parent material resistivity, for example, may be reduced.

As above, the methods disclosed herein produce expanded parent material 44 from a parent material. In an embodiment, the expanded parent material 44 comprises exfoliated nanosheets. In an embodiment, the exfoliated nanosheets are chosen from exfoliated nanosheets composed of graphene, graphene oxide, graphite oxide, graphene, graphyne, borophene, germanene, germanane, silicone, stanine, phosphorene, molybdenite, 2D metals, transition metal di-chalcogenides, molybdenum disulfide, tungsten diselenide, and MXenes.

In an embodiment, the parent material 40 comprises graphite and the expanded parent material 44 comprises graphene. In an embodiment, the parent material 40 comprises graphite and the expanded parent material 44 comprises particles comprising several layers of graphene adhered to one another.

In certain embodiments, electrochemical exfoliation of a parent material 40 is incomplete, leaving some parent material 40 unexpanded. Accordingly, in an embodiment, the method includes separating the expanded parent material 44 from the parent material 40. In an embodiment, separating the expanded parent material 44 from the parent material 40 includes washing a mixture of expanded parent material 44 and parent material 40 in solution and centrifuging the solution. Sediment including the parent material 40 is discarded while the washed expanded parent material 44, in solution or suspension, is retained.

Expanded Parent Material

In another aspect, the present disclosure provides a composition comprising an expanded parent material 44.

As used herein, expanded parent material 44 refers to a material including sheets, plates, layers, or the like, wherein at least a portion the sheets, plates, layers, etc. are physically separated from other sheets, plates, layers, etc. In an embodiment, the expanded parent material 44 is formed by an electrochemical expansion method. In an embodiment, the expanded parent material 44 includes material includes materials several atoms thick. In an embodiment, the expanded parent material 44 includes several planar layers adhered through non-covalent forces. In an embodiment, expanded parent materials 44 include exfoliated parent materials in which a parent material is electrochemically exfoliated to separate layers of the parent material.

Figure 11A:
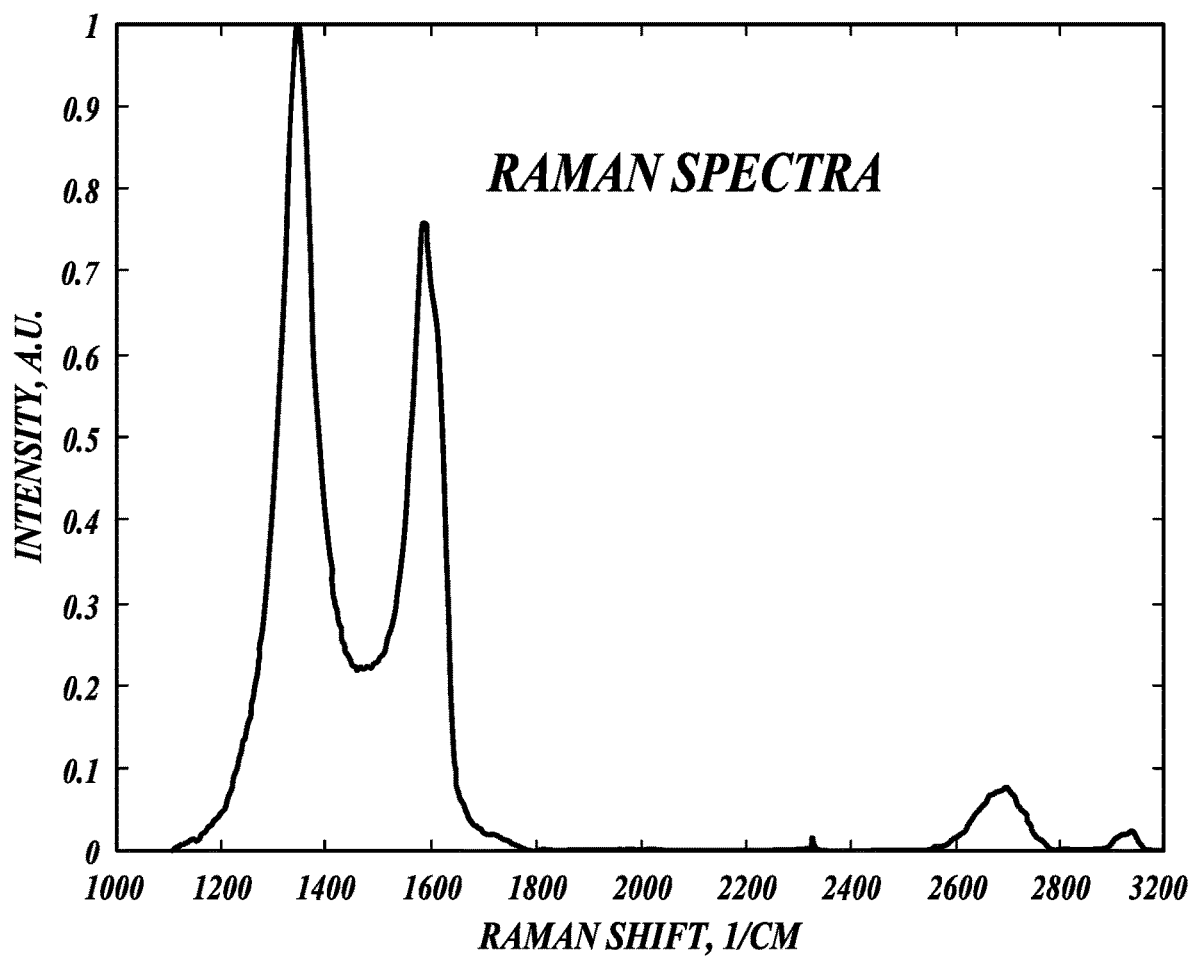
FIG. 11A graphically illustrates Raman spectra from electrochemically expanded graphite according to an aspect of the disclosure.
Figure 11B:
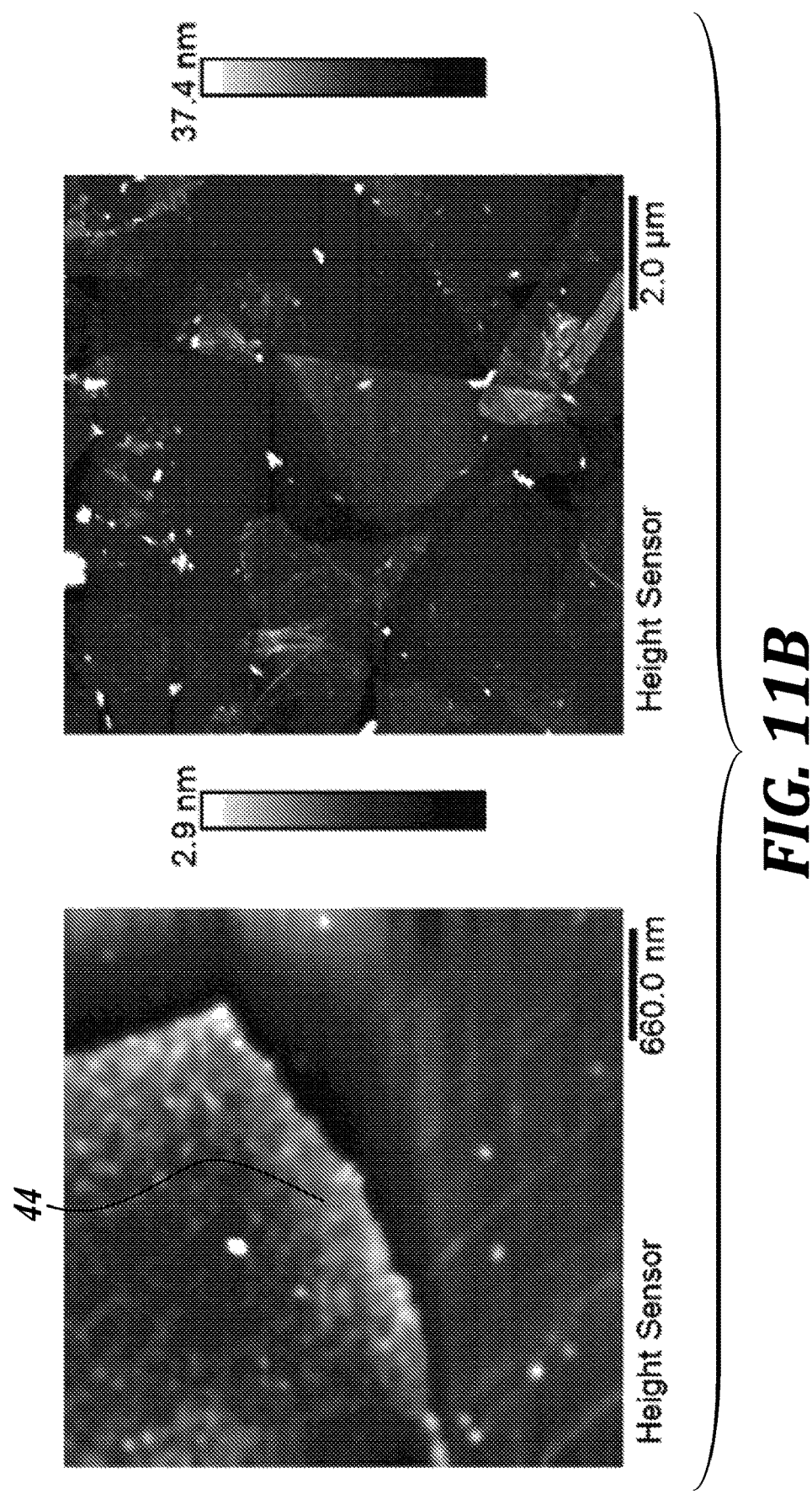
FIGS. 11B and 11C are atomic force microscopy images of electrochemically exfoliated graphene according to an aspect of the disclosure.
Figure 11D:
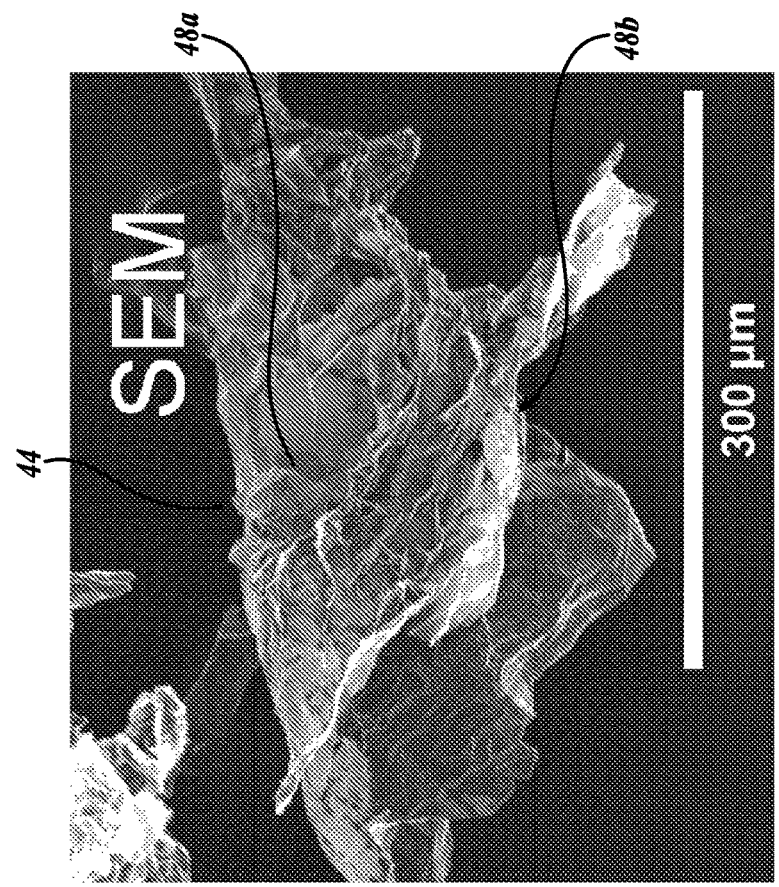
FIG. 11D is a scanning electron microscopy image of partially electrochemically exfoliated graphene according to an aspect of the disclosure.

In an embodiment, the expanded parent material 44 includes exfoliated nanosheets. In an embodiment, the exfoliated nanosheets have a first major surface and a generally opposing second major surface. FIG. 11D is a scanning electron microscope image of an exfoliated nanosheet according to an embodiment disclosed herein. SEM and AFM imaging of expanded parent materials 44 are discussed further herein in Example 3 of the present disclosure. As shown, the exfoliated nanosheet has a first major surface 48a and a second major surface 48b generally opposing the first major surface 48a. The first major surface 48a and second major surface 48b define the lateral dimensions of the exfoliated nanosheets.

Figure 10B:
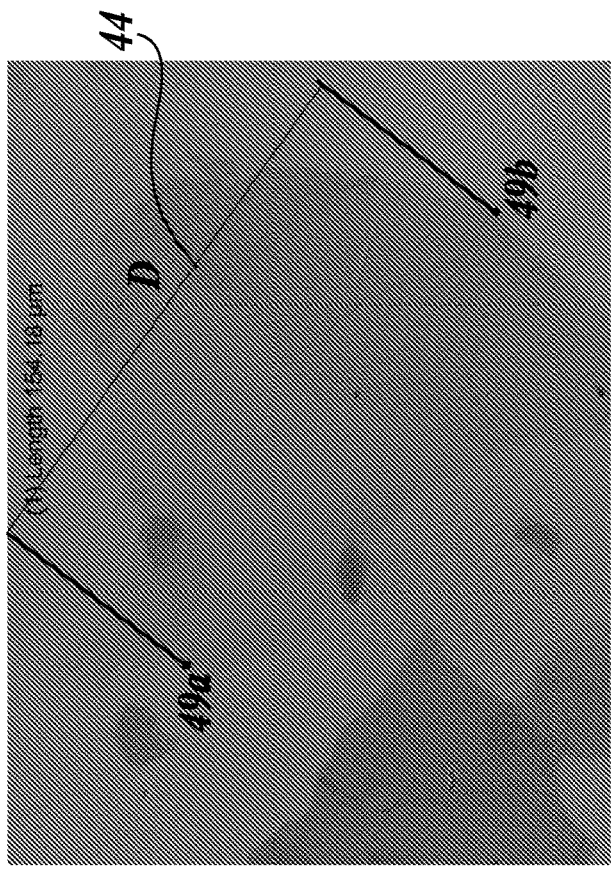
FIGS. 10A and 10B are optical images of graphene flakes according to aspect of the disclosure.
Figure 10A:
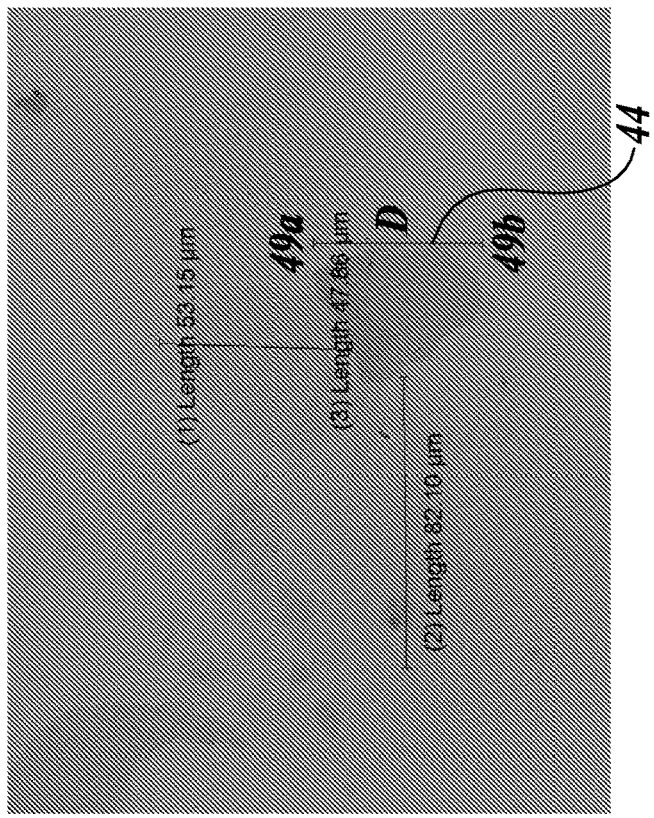

Each exfoliated nanosheet has a largest lateral dimension, defined as the largest distance between two points on one of the first major surface 48 or second major surface 48b. In that regard, attention is directed to FIGS. 10A and 10B, where optical images of graphene nanosheets according to aspect of the disclosure are illustrated. Optical imaging of expanded parent materials 44 are discussed further herein in Example 4 of the present disclosure. As shown, the graphene nanosheets include points 49a and 49b, the two points of a major surface farthest away from one another. The distance D between those two points is the largest lateral distance of the exfoliate nanosheet. Such distances can be measured, for example, using a scanning electron microscope, an optical microscope, an atomic force microscope, dynamic light scattering, and the like.

In an embodiment, the average largest lateral dimension of the exfoliated nanosheets is between about 75 μm and about 300 μm. In an embodiment, the average largest lateral dimension of the exfoliated nanosheets is between about 150 μm and about 300 μm. In an embodiment, the average largest lateral dimension of the exfoliated nanosheets is between about 200 μm and about 300 μm.

Exfoliated nanosheets have a thickness. In an embodiment, the thickness is defined by the distance between the first major surface 48 and the second major surface 48b of the exfoliated nanosheet. FIG. 11B is an atomic force microscope image of exfoliated nanosheets according to embodiments disclosed herein. In an embodiment, the thickness of the exfoliated nanosheets can be measured using an atomic force microscope.

In an embodiment, the composition includes exfoliated nanosheets having an average thickness of between about 0.5 nm and about 10 nm. In an embodiment, the composition includes exfoliated nanosheets having an average thickness of between about 2 nm and about 10 nm. In an embodiment, the composition includes exfoliated nanosheets having an average thickness of between about 5 nm and about 10 nm.

As above, previous methods of exfoliating parent materials are limited in how much parent material can be exfoliated. This is in contrast to the methods disclosed herein. In an embodiment, the compositions disclosed herein comprise greater than 75% expanded parent material 44 by dried solid mass. In an embodiment, the compositions disclosed herein comprise between about 80% and about 99% expanded parent material 44 by dried solid mass. In an embodiment, the compositions disclosed herein comprise between about 90% and about 99% expanded parent material 44 by dried solid mass.

Figure 11C:
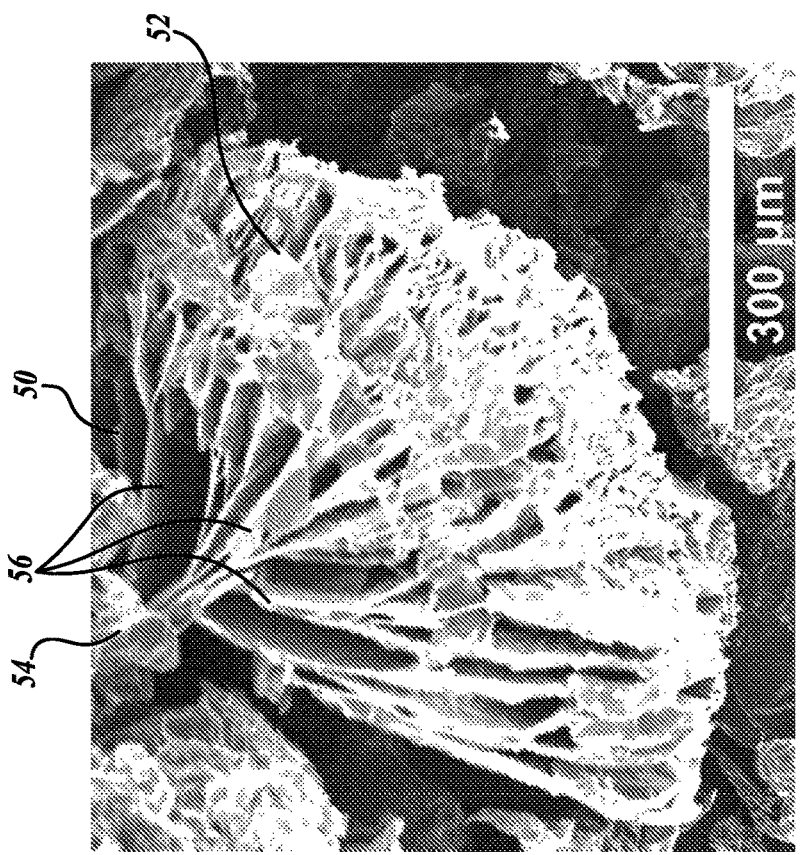

In an embodiment, the composition comprises partially-expanded parent material 44 comprising a plurality of partially-exfoliated nanosheets. As above, the methods and reactors described herein expand parent materials through electrochemical expansion. In certain embodiments, the electrochemical expansion is incomplete and the particles, flakes, or granules of parent material 40 are partially expanded. In this regard, attention is directed to FIG. 11C, where a partially-expanded parent material 50 according to embodiments of the disclosure is illustrated. As shown, the partially-expanded parent material 50 includes a plurality of partially-exfoliated nanosheets 56 having an open cell structure. In an embodiment, parent material 40 expands at a first edge 52 leaving a second edge 54 unexpanded, providing a book-like structure. Without being bound by theory, it is believed that the electrolyte wets the first edge and expands the parent material leaving the second edge unexpanded.

In an embodiment, the composition has a bulk resistivity of between about 5 Ω/meter and about 10,000 Ω/meter. In an embodiment, the composition has a bulk resistivity of between about 5 Ω/meter and about 100 Ω/meter.

In an embodiment, the expanded parent material 44 comprises graphene and the molar ratio of carbon to oxygen of the expanded parent material is between 30:1 and about 3:1. The molar ratio of carbon to oxygen can be measured Raman spectroscopy measuring the D/G ratio in Raman spectra, as shown in FIG. 11A. In an embodiment, the molar ratio of carbon to oxygen of the expanded parent material is between 30:1 and about 10:1. In an embodiment, the molar ratio of carbon to oxygen of the expanded parent material is between 30:1 and about 20:1

In an embodiment, the composition comprises a liquid which together with the expanded material 44 forms a slurry. In an embodiment, the liquid is an aqueous liquid. In an embodiment, the liquid is a polar liquid. In an embodiment, the liquid is an organic liquid. In an embodiment, the liquid is a non-polar liquid.

In an embodiment, the expanded parent material 44 is the form of a lyophilized powder.

In an embodiment, the expanded parent material 44 is an expanded parent material 44 formed according to the methods described herein. In an embodiment, the expanded parent material 44 formed according to the methods described herein has a mass of between about 1 g and about 20 g with a starting mass of parent material between about 2 g and about 40 g.

EXAMPLES

Example 1: Electrochemical Exfoliation of Graphite Flakes 5 g of graphite flakes were compacted in a dialysis tubing of approximately 30 cm in length, flat with 25 mm, (Sigma-Aldrich, cellulose membrane) with a platinum wire placed inside. The portion of the dialysis tubing containing the graphite flakes was clamped on both sides with clips to maintain pressure on the graphite flakes. This assembly served as the cathode. The compact cathode was immersed in 3 L of a 0.1 M ammonium sulfate (($NH_4$)$_2SO_4$, from Sigma-Aldrich) aqueous electrolyte solution. A piece of graphite plate served as the anode. The cathode and anode were connected to a power supply. 10 V were applied to the dialysis bag with graphite flakes during electrochemical expansion, with a compliance current of ~0.5 A. Electrochemical expansion time varied from 1-24 hours.

The electrochemically expanded graphite (EEG) was then washed via centrifugation with DI water five times. After washing, the EEG was transferred into a 400 mL Erlenmeyer flask, and the flask was filled up to 300 mL with DI water. After 30 seconds, the supernatant was transferred into a beaker for further characterization and treatments. The remaining sediment is unexpanded graphite.

Example 2: Pre-Treatment of Graphite Flakes to Functionalize Graphite with a Hydrophilic Moiety 5 g flake graphite (from Sigma-Aldrich) was mixed with 40 mL of a 6 M $HNO_3$ solution. The mixture was transferred into a 45 mL Teflon lined autoclave reactor, heated at 120° C. for 3 hours and then cooled to room temperature. After filtering and washing with deionized (DI) water five times, the resulting solid product was kept in DI water for further exfoliation as described further herein.

Example 3: Imaging Samples of Expanded Parent Material Using AFM and SEM

The expanded parent material is dispersed in a liquid and cast on a substrate. The liquid is allowed to evaporate. The expanded parent material is then imaged using an atomic force microscope or scanning electron microscope. As described elsewhere herein, lateral dimensions of the expanded parent material can be calculated using SEM images and expanded parent material thickness can be calculated using AFM images.

Example 4: Imaging Samples of Expanded Parent Material Using an Optical Microscope Expanded material is dispersed in a liquid. Optical images of the expanded parent material can be obtained either by solvent casting the expanded material as described elsewhere herein or by imaging the expanded parent material directly in a dilute solution.

It should be noted that for purposes of this disclosure, terminology such as "upper," "lower," "vertical," "horizontal," "inwardly," "outwardly," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. The term "about" means plus or minus 5% of the stated value.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

While illustrative embodiments have been illustrated and described, it will be appreciated that various changes can be made therein without departing from the spirit and scope of the disclosure.

The embodiments of the invention in which an exclusive property or privilege is claimed are defined as follows:

1. A reactor configured to deliver electric current to a parent material to produce expanded parent material, the reactor comprising:
an electrically insulating container, comprising:
an expandable chamber configured to contain the parent material, wherein the expandable chamber is configured to expand in at least one direction in order to accommodate expansion of the parent material as it transitions to the expanded parent material, while also maintaining pressure on the parent material and any expanded parent material sufficient to maintain the conditions necessary to generate the expanded parent material;
an electrolyte chamber configured to be in fluid communication with an electrolyte solution; and
a porous membrane separating the expandable chamber and the electrolyte chamber configured to allow ions to pass through the porous membrane but not the parent material and any expanded parent material; wherein the porous membrane is configured to contain the pressure of the expanded parent material; and
an electrical system, comprising:
a first electrode configured to be in electrical communication with an interior of the expandable chamber and any parent material disposed in the expandable chamber; and
a second electrode configured to be in electrical communication with the electrolyte chamber and any electrolyte solution disposed in the electrolyte chamber.

2. The reactor of claim 1, further comprising an electrical power source in electrical communication with the first electrode and the second electrode, wherein during operation a circuit is formed that comprises the electrical power source, the first electrode, the second electrode, the electrolyte solution, and the parent material, wherein the electrical power source is configured to produce electrical power sufficient to generate the expanded parent material from the parent material.

3. The reactor of claim 1, wherein the porous membrane comprises pores having pore sizes between about 50 nm and about 10 μm.

4. The reactor of claim 1, wherein the porous membrane comprises pores having pore sizes smaller than an average smallest lateral dimension of the parent material and the expanded parent material.

5. The reactor of claim 1, wherein the porous membrane comprises a material selected from the group consisting of a porous polymeric material, a porous metallic material, porous glass, a woven porous material, a non-woven porous material, and combinations thereof.

6. The reactor of claim 1, wherein the porous membrane comprises a porous material selected from the group consisting of hydrophilic polytetrafluoroethylene (PTFE), hydrophobic PTFE, glass, cellulose, polycarbonate, cellulose acetate, nylon, cotton cloth, cellulose esters, and combinations thereof.

7. The reactor of claim 1, wherein the expandable chamber comprises an expandable element configured to expand as pressure within the expandable chamber increases.

8. The reactor of claim 7, wherein the expandable element is selected from the group consisting of a piston, a balloon, bellows, and a diaphragm.

9. The reactor of claim 1, wherein the expandable chamber is a first expandable chamber, the reactor further comprising:
a second expandable chamber configured to contain a second parent material; wherein the second expandable chamber is configured to expand in at least one direction in order to accommodate expansion of the second parent material as it transitions to a second expanded parent material, while also maintaining pressure on the second parent material and any second expanded parent material sufficient to maintain the conditions necessary to generate the second expanded parent material;
a third electrode configured to be in electrical communication with an interior of the second expandable chamber and any second parent material disposed therein; and
a second porous membrane separating the second expandable chamber and the electrolyte chamber configured to allow ions to pass through the porous membrane but not the second parent material or the expanded parent material; wherein the second porous membrane is configured to contain the expanding parent material.

10. The reactor of claim 1, wherein the reactor is a continuous flow reactor configured to continuously transform flowing parent material into expanded parent material.

11. The reactor of claim 1, wherein an area of the second electrode is greater than an area of the porous membrane.

12. The reactor of claim 1, wherein the electrical power source is configured to apply between about 1 W and about 200 W to any parent material.

13. The reactor of claim 1, further comprising an agitator configured to disperse any parent material disposed in the expandable chamber in the electrolyte solution.

* * * * *